UNITED STATES PATENT OFFICE.

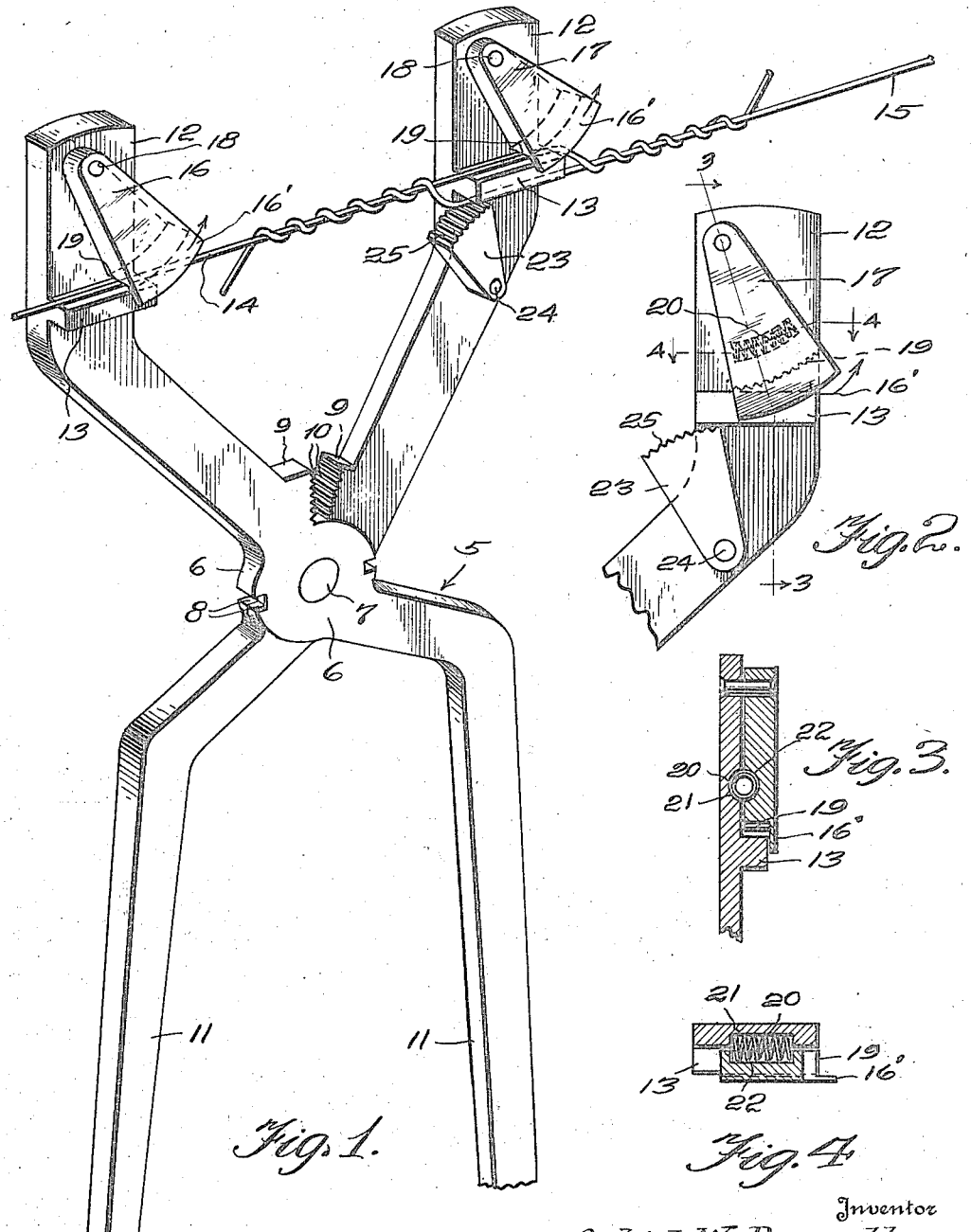

ORBID W. BURNETT, OF LACLEDE, MISSOURI, ASSIGNOR OF ONE-HALF TO JOHN L. WELSH, OF LACLEDE, MISSOURI.

APPARATUS FOR STRETCHING WIRE.

1,269,381.

Specification of Letters Patent.    Patented June 11, 1918.

Application filed September 22, 1917. Serial No. 192,699.

*To all whom it may concern:*

Be it known that I, ORBID W. BURNETT, a citizen of the United States, residing at Laclede, in the county of Linn and State of Missouri, have invented certain new and useful Improvements in Apparatus for Stretching Wire, of which the following is a specification.

My invention relates to apparatus for pulling or stretching wire, either smooth or barbed, in the building or repairing of fences, while not necessarily restricted to this use.

An important object of the invention is to provide the pivoted arms of tongs with means for attachment with a strand of wire, and with means to automatically feed or advance another strand, to be connected with the first named strand, the feeding movement being automatically effected by the swinging of one arm with respect to the other.

A further object of the invention is to provide apparatus of the above mentioned character, which is simple in construction, inexpensive to manufacture, strong and durable.

Other objects and advantages of the invention will be apparent during the course of the following description.

In the accompanying drawings forming a part of this specification and in which like numerals are employed to designate like parts throughout the same, Figure 1 is a perspective view of apparatus embodying my invention, Fig. 2 is a side elevation of the forward end of one arm of the tongs, Fig. 3 is a longitudinal section, taken on line 3—3 of Fig. 2, and, Fig. 4 is a transverse section taken on line 4—4 of Fig. 3.

In the drawings, wherein for the purpose of illustration is shown a preferred embodiment of my invention, the numeral 5 designates arms of a pair of tongs, which are provided centrally thereof with circular disks 6, disposed in contacting relation, as shown. These disks are pivoted by a transverse element 7. The disks 6 are provided with coacting openings or notches 8, which constitutes means for receiving and cutting wire. The arms 5 cross, as shown, and are provided forwardly of the pivot 7 with clamping jaws 9, the inner faces of which are preferably serrated, as shown at 10. These jaws function as pliers or clamping means, adapted for holding two strands of wire which are to be twisted or otherwise secured together.

At their rear ends, the arms 5 are provided with handles 11. preferably formed integral therewith.

At their forward ends, the arms 5 are provided with extensions 12, preferably formed integral therewith. These extensions are provided with transverse relatively stationary lugs or clamping elements 13, preferably formed integral with the extensions. These lugs are adapted to contact with strands of wire 14 and 15, as shown. Disposed forwardly of the lugs 13 are feeding and holding dogs 16 and 17, pivoted to the extensions 12, as shown at 18. These dogs are adapted to swing in the same direction, as indicated by the arrows. The dogs 16 and 17 are provided at their rear ends with serrated cam faces 19, to contact with the strand of wire 14, and clamp or bind the same to the lugs 13. Each dog is normally retained in the inner position, in close proximity to the lug 13, by a compressible coil spring 20, disposed within semicircular recesses 21 and 22, which are formed in the extension 12 and dog 16, respectively, as more clearly shown in Fig. 4. Each dog 16 has a rearwardly projecting flange 16', adapted to span the side of the element 13, as clearly shown in Fig. 3.

Means are provided for attaching one arm 5 of the apparatus to the strand of wire 15, preferably including a dog 23, arranged rearwardly of the lug 13, and pivoted to the arm, as shown at 24. The dog 23 has its forward end provided with a serrated cam face 25 for clamping or binding the strand of wire 15 against the rear side of the lug 13.

In operating the apparatus, for securing the ends of the strands of wire 14 and 15 together, the apparatus as a whole is attached to the strand of wire 15, by passing such strand between the dog 23 and the lug 13. The end of the strand 14 is then placed upon the forward sides of the lugs 13, and engaged by the dogs 16 and 17. The arm 5 secured to the strand 15 is preferably held stationary, while the other arm 5 is swung in opposite directions upon its pivot. The dog 16 will function to feed the strand of wire 14 to the right, upon its arm 5 being swung in that direction, and when this arm is swung to the left, the dog 17 serves as a check to bind or clamp the wire against returning movement. It is thus apparent that the wire 14 may be given a step by step feeding movement to the right, and when the two strands of wire have been drawn suitably taut, their ends are twisted about each other, as indicated in Fig. 1. It is obvious that the apparatus may be removed from engagement with the strands of wire, after the work is completed.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In apparatus of the character described, a pair of crossing arms which are pivoted together at the point of crossing, said arms being provided with forward extensions; transverse lugs carried by the forward extensions and spaced from the forward ends thereof; dogs pivoted to the forward ends of the extensions and disposed forwardly of the lugs and provided with rearwardly extending flanges which extend over the sides of the lugs to prevent the strand of wire from passing off of the same, said dogs swinging in the same direction; and a third dog pivoted to one arm and arranged rearwardly of and near the transverse lug thereof for clamping the wire to such lug.

2. In apparatus of the character described, a pair of crossing arms which are pivoted at the point of crossing and are provided at their forward ends with extensions, said extensions being provided upon corresponding sides thereof with recesses; transverse lugs carried by said corresponding sides of the extensions and arranged at points spaced from the forward ends of the extensions; dogs disposed forwardly of the lugs and pivoted to the forward ends of the extensions, said dogs swinging in the same direction, said dogs being provided upon their inner sides with recesses adapted for co-action with the first named recesses; and a compressible coil spring arranged within the co-acting recesses.

In testimony whereof I affix my signature.

ORBID W. BURNETT.

Copies of this patent may be obtained for five cents each, by addressing the "Commissioner of Patents, Washington, D. C."